Sept. 2, 1969  W. JACKSTADT  3,464,842
SELF-SEALING FOIL HAVING PLURAL ADHESIVE LAYERS
Filed March 26, 1963

INVENTOR.
Werner Jackstadt
BY Ernest Montague
Attorney

United States Patent Office 3,464,842
Patented Sept. 2, 1969

3,464,842
SELF-SEALING FOIL HAVING PLURAL ADHESIVE LAYERS
Werner Jackstadt, Wuppertal-Sonnborn, Germany, assignor to Firma Wilhelm Jackstadt & Co., Wuppertal-Elberfeld, Germany, a corporation of Germany
Filed Mar. 26, 1963, Ser. No. 268,195
Claims priority, application Germany, Jan. 4, 1963,
J 22,959
Int. Cl. B05c *3/20;* B44d *1/12*
U.S. Cl. 117—44                    3 Claims

ABSTRACT OF THE DISCLOSURE

A self-sealing foil which comprises a backing carrying two superimposed self-sealing films including an outer lowermost reversible self-sealing film and an intermediate irreversible self-sealing film. The outer lowermost self-sealing film has the character of a reversibly adherent, self-sealing layer, capable of being removably applied to an object upon subjecting the same to slight pressure, and the intermediate irreversible self-sealing layer has the character of an irreversibly adherent self-sealing layer, capable of being immovably applied to an object upon subjecting the same to heavy pressure. One of the layers contains exclusively polymer softeners, resins and viscid makers, and the reversible film is operatively thin relative the irreversible film so that upon application of sufficient pressure the irreversible film is pressed through to the surface of the reversible film.

---

The present invention relates to self-sealing foils, tapes, labels, etc. and to a method of making the same.

It has been known to make self-sealing foils, tapes, labels, etc., in which the self-sealing film or layer adheres irreversibly to the base to which it is applied. Upon applying the self-sealing film to the base the nature of the latter being adapted to the composition of the self-sealing film, the latter cannot be removed any longer from the base, except by destruction of the self-sealing film itself.

On the other hand, self-sealing foils, labels, etc. or other base members equipped with self-sealing faces are known, in which the self-sealing film or layer adheres reversibly to the base to which it is applied. Such foils may be removed from the base and then made to adhere again to the same place as before or to any other place. An essential guideline in the manufacture of such self-sealing foils with either irreversibly or reversibly adhering adhesive films is the adjustment of the tensile strength of the carrier supporting the self-sealing layer to the adhesive strength with which the self-sealing film adheres to the base to which the foil is to be applied.

There are many disadvantages connected with the fact that two essentially different types of self-sealing foils or the like have to be manufactured, stored and differentiated in actual use to obtain the two different effects of either reversible or irreversible adhesion.

It is one object of the present invention to provide a self-sealing foil which avoids these drawbacks.

It is another object of the present invention to provide a self-sealing foil or the like, which comprises one single type of self-sealing foils, tapes, labels, etc., which adheres, selectively, according to the desired effect, and according to the handling by the user, in such a manner that there is obtained either an irreversible or a reversible adherence of the self-sealing surface to the base to which it is applied.

It is another object of the present invention to provide a self-sealing foil or the like which comprises two superimposed adhesive films disposed on a carrier, one of the films being a reversibly adherent outer film and the other of the films being an irreversibly adherent intermediate film.

Due to this arrangement, the self-sealing face, by example of a label, of a foil made of a predetermined material, or of any other base member, is designed and characterized such, that depending upon the size of the pressure forces applied to the face, either a reversible adherence on the base or on irreversible adherence on the basis occurs. If the foil is pressed slightly onto its base, for instance, by a normal, slight gliding of the hand over the foil, only a reversible adherence is brought about; for only the outer reversibly adherent film of the carrier comes into contact with the base. If, however, the self-sealing foil, etc. is pressed instead against the base by applying high pressure, the intermediate irreversibly adherent self-sealing film comes into contact with the base either partly or completely. The reversible adherence may be brought about either by intermixing of the intermediate, irreversibly self-sealing layer with the outer reversibly adhering self-sealing layer, or by pressing through the irreversibly adherent self-sealing intermediate layer through the reversibly adherent, self-sealing outer layer. To apply such high pressure it is particularly advantageous to use a roller which progressingly exerts the full pressure only onto relatively small surface areas. Experience has shown that the corresponding pressures for obtaining an irreversible adherence, for instance, by a progressive, continuous pressing down of small surface areas, may also be obtained with the fingers of the user. Due to this arrangement, not only an improved self-sealing foil is obtained regarding its purpose of use, but in addition, an appreciable simplification in the manufacture and in the storing of the self-sealing foil occurs. It is further of importance, as it has been found, that a diffusion of the two self-sealing layers into each other, particularly upon providing a corresponding, appropriate composition, of the two adhesive layers of film is not to be expected, even over longer time periods of use, nor is there any danger, that upon removing the self-sealing foil, etc., which has been attached only reversibly to the base, will bring about the separation of the two adhesives films.

It is still another object of the present invention to provide a self-sealing film or the like, wherein the irreversibly adhering, intermediate adhesive foil is thicker than the reversibly adhering outer foil. Regardless of the values of adhesive strength inherent in the adhesive films themselves, it is possible to predetermine, within rather wide limits, by a proper choice of the relation between those two thicknesses, pressure at which only a reversible adherence occurs, and the pressure at which the essentially irreversibly adherence becomes effective to an appreciable measure.

It is yet another object of the present invention to provide a self-sealing foil or the like, wherein the reversibly adherent, outer adhesive film is formed in form of a screen or in form of stripes. By a forceful application of pressure, the irreversibly adherent, intermediate foil closest to the backing or carrier penetrates easily through the interstices remaining between the stripes or in the screen onto the base to which the foil is to be applied.

It is also yet another object of the present invention to provide a self-sealing foil, wherein one of the two adhesives films or layers contains exclusively polymeric addition products, such as plasticizers rosins, etc., that are not capable of diffusing into the other of the films or layers.

With these and other objects in view, which will become apparent in the following detailed description, the present invention will be clearly understood in connection with the accompanying drawing, in which.

Figure 1:
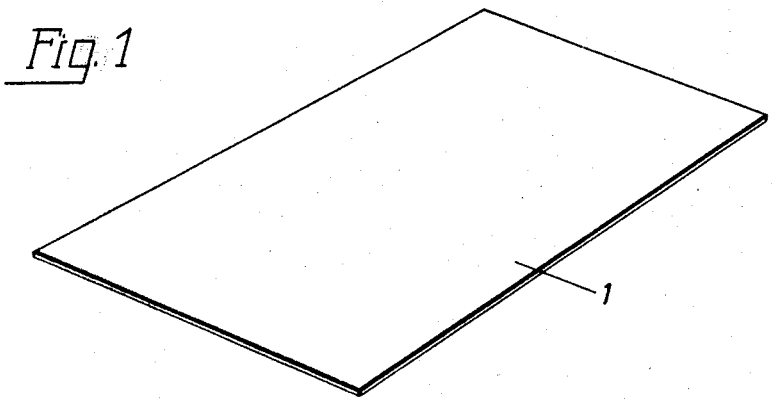
FIG. 1 is a perspective view of a self-sealing foil.
Figure 2:
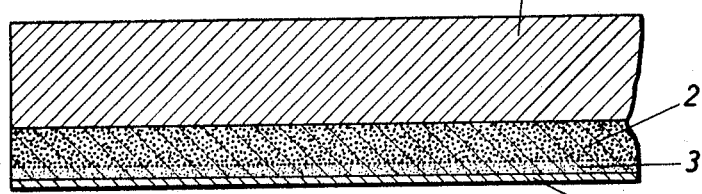
FIG. 2 is a cross-section of the foil, shown at an enlarged scale, according to FIG. 1, the adhesive foils or layers being shown schematically.

Referring now to the drawing, the self-sealing foil comprises a foil-like carrier or backing 1, two superimposed, self-sealing adhesive films or layers 2 and 3 and a protective film 4 consisting of siliconized paper or the like, which is known. Before using the self-sealing foil, the protective film 4 is removed in known manner.

The foil or layer 2 constitutes an irreversibly adherent, self-sealing layer; the foil or layer 3 constitutes a reversibly adherent, self-sealing layer. In general, the tensile strength of the carrier or backing 1 will have a value which is between the values of the adhesive strength of the two layers 2 and 3.

Figure 3:
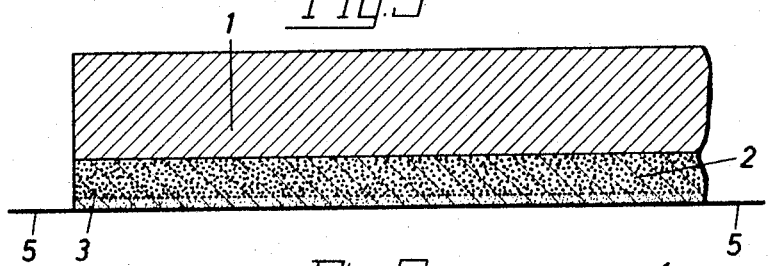
FIG. 3 is a view similar to that of FIG. 2, indicating schematically the conditions prevailing during reversible adherence.
Figure 4:
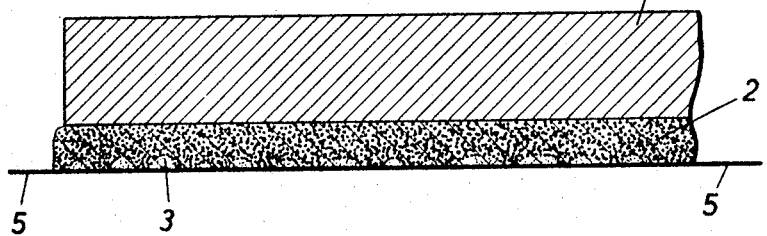
FIG. 4 is a view similar to that of FIG. 2, indicating schematically the conditions prevailing during irreversible adherence.

If now, as shown in FIG. 3, normal pressure is exerted on the backing or carrier 1, only the reversibly adherent layer 3 will adhere to a base 5. In such a case, the backing or carrier 1 may be removed jointly with the layers 2 and 3 from the base 5 and, if desired, made to adhere again into the same spot or on any other spot. If, however, as shown in FIG. 4, a considerable pressure is exerted on the backing or carrier 1, the irreversibly adherent intermediate layer 2 will come into contact and have its effect with the base 5. The condition of the two layers, as shown in FIG. 4, constitutes the final or an intermediate state of the irreversible adherence of the foil. By exerting additional roller-like pressures, it is possible to obtain a state, in which the irreversibly adherent, adhesive layer 2 becomes effective over the entire face of the base 5.

The adhesive layer 2 is thicker than the adhesive layer 3, and in particular preferably, for a multiple of thickness of the film 3.

The backing layer 1 may comprise soft, pliable foils of polyvinyl chloride (PVC), cellulose acetate, aluminum, laminated paper-aluminum, paper, particularly heavy paper free of wood fibers (rag paper), fabrics of chemical fibers, fleece, synthetic fabrics, or the like. The following examples suggest various compositions of the respective films in their application to appropriate backings or carriers 1.

EXAMPLE 1

(a) 200 parts by weight (p.b.w.) of a 50% aqueous dispersion or emulsion of polyacrylic ester are mixed and stirred with 100 parts by weight of an aqueous dispersion or emulsion of poly-isobutyl-ether. This mixture is applied to a soft, pliable PVC foil of a thickness of $100\mu$, so that 40 g. dry solids remain per m.$^2$ on the foil after evaporation of the water.

(b) 100 p.b.w. of natural rubber are admixed to 100 p.b.w. of a paste consisting of about 1 part of lanoline and 1 part of zinc oxide and 500 p.b.w. of benzene or benzin. The mixing is carried out in a kneading machine used for dissolving solids in liquids. To this mixture are added 50 p.b.w. of a hydrated ester of colophony (rosin). These ingredients are mixed until complete homogeneity is obtained. Thereupon, this mixture is applied to a soft, pliable PVC foil as described under (a) in such a manner that 5 g./m.$^2$ dry solids remain on the surface after evaporation of the solvents.

After the two layers of the material described (1a) and (1b) have been applied to the PVC foil, a siliconized paper is used to protect the adhesive films of the foil.

EXAMPLE 2

(a) 100 p.b.w. of a polyacrylic ester are dissolved in 500 p.b.w. of ethyl acetate in a stirring apparatus. 50 p.b.w. of polyvinyl decalyl ether are stirred into this mixture until complete solution is obtained. The resulting solution is applied to a foil of cellulose acetate of a thickness of $35\mu$, so that 35 g. of dry solids remain per m.$^2$ after evaporation of the solvent.

(b) 100 p.b.w. of isoprene rubber are added to 500 p.b.w. of benzene or benzin. This mixture together with 40 p.b.w. of factice from rape-seed oil and 5 b.p.w. of paraffin oil is homogenized in a kneading machine. The resulting mixture is applied to the cellulose acetate foil, (as mentioned above under 2a), in such thickness that 10 g./m.$^2$ of dry solids remain on the basis after evaporation of the solvent.

The two self-sealing films are covered in known manner with a silicon-paper.

EXAMPLE 3

(a) 100 p.b.w. of polyvinyl isobutyl ether and 50 p.b.w. of a polyterpene resin are dissolved in 600 p.b.w. of benzene or benzin in a kneading machine used for dissolving solids in liquids. This mixture is applied to an aluminum foil of a thickness of $25\mu$ in amounts such that 20 g./m.$^2$ dry solids remain on the surface after evaporation of the solvent.

(b) 100 p.b.w. of an ethylen-vinyl acetate-co-polymer are dissolved in 500 p.b.w. of toluol or toluene with the help of a stirring apparatus. To this solution there are added 40 p.b.w. of chlorinated diphenyl and 10 p.b.w. of chloro-paraffin. This solution is applied to the aluminum foil carrying already the layer, described above under (3a), in such a manner that 5 g./m.$^2$ dry solids remain after evaporation of the solvent.

The two self-sealing layers are covered in conventional manner with siliconized paper.

EXAMPLE 4

(a) 100 p.b.w. of styrene-butadiene-rubber are treated in a kneading machine with a mixture of 300 p.b.w. of benzene or benzin, 200 p.b.w. of xylene or xylol, 50 p.b.w. of polyadipate and 50 p.b.w. of a terpene-phenol resin until a homogenized consistency is obtained. This mixture is applied to a paper free of wood pulp (rag paper) having a weight of 80 g./m.$^2$ in such amounts, that 30 g./m.$^2$ dry solids remain after evaporation of the solvent.

(b) 100 p.b.w. of polyisobutylene of high molecular weight, 100 p.b.w. of polyisobutylene of intermediate molecular weight, 30 p.b.w. of polyisobutylene of low molecular weight and 600 p.b.w. of benzene or benzin are treated in a kneading machine until a smooth consistency is obtained. This mixture is then applied to the paper treated, as above under (4a), in such a manner that 8 g./m.$^2$ dry solids remain after evaporation of the solvent.

The two self-sealing films are covered in conventional manner with siliconized paper.

EXAMPLE 5

(a) 100 p.b.w. of amorphous polypropylene, 50 p.b.w. of an alkyd resin, 70 p.b.w. of colophony, 30 p.b.w. of the methyl ester of abietic or abietinic acid together with a mixture of 200 p.b.w. of ethyl acetate, 100 p.b.w. of toluol or toluene and 100 p.b.w. of benzene or benzin are dissolved in a stirring apparatus. The solution obtained is applied to a fibre-fleece so that 25 g./m.$^2$ dry solids remain after evaporation of the solvent.

(b) 100 p.b.w. of a mixed polymer of butadiene-acrylonitrile of high molecular weight are dissolved in a stirring apparatus in a mixture of 500 p.b.w. of methyl ethyl ketone, 200 p.b.w. of ethyl acetate and 100 p.b.w. of acetone. During the stirring process there are added 40 p.b.w. of a mixed polymer of butadiene-acrylonitrile of low molecular weight and 50 p.b.w. of a cumaron-indene resin. The resulting mixture is applied to the fleece, prepared as described above under (5a), so that 7 g./m.$^2$ dry solids remain after evaporation of the solvent.

The two self-sealing layers are covered in conventional manner with siliconized paper.

EXAMPLE 6

(a) 100 p.b.w. of a non-crystalizing polychloroprene are treated in a kneading machine with 700 p.b.w. of toluol or toluene and 200 p.b.w. of ethyl acetate until a homogenous consistency is attained. Then there are added 45 p.b.w. of polychloroprene of a flow point of 60° C. The homogenized mixture is applied to a fabric of synthetic fibres, having about 18 warp and waft threads per French inch, in such a manner that 100 g./m.$^2$ dry solids remain after evaporation of the solvent.

(b) 100 p.b.w. of a mixed polymer of isobutylene-isoprene are treated in a kneading machine with 27 p.b.w. of polyisobutylene of low molecular weight and 500 p.b.w. of benzene or benzin until a smooth consistency is obtained. This mixture is applied to the fabric, treated as above described under 6(a), so that 12 g. dry solids remain per m.$^2$ after evaporation of the solvent.

The two self-sealing layers are covered in conventional manner with siliconized paper.

It should be noted that the carrier or backing 1 must not necessarily be formed as a foil, but may constitute the appropriate self-sealing surface of any body or article desired to be self-sealingly attached to a particular surface or basis.

While I have disclosed several embodiments of the present invention, it is to be understood that these embodiments are given by example only and not in a limiting sense, the scope of the present invention being determined by the objects and the claims.

I claim:
1. A self-sealing foil, comprising
   a backing layer,
   a reversible pressure sensitive adhesive layer adapted to removably adhere to a surface upon the application of pressure,
   an irreversible pressure sensitive adhesive layer adapted to non-removably adhere to a surface and disposed between said backing layer and said reversible pressure sensitive adhesive layer, and
   said reversible pressure sensitive adhesive layer being operatively thin relative to said irreversible pressure sensitive adhesive layer such that upon the application of sufficient pressure to said backing layer, said irreversible pressure sensitive adhesive layer is pressed through to the surface of said reversible pressure sensitive adhesive layer, and
   one of said adhesive layers contains exclusively polymer softeners, resins and viscid makers which are not capable of diffusing into the other of said adhesive layers.
2. The self-sealing foil, as set forth in claim 1, wherein said reversible pressure sensitive adhesive layer has a stripe formation.
3. The self-sealing foil, as set forth in claim 1, wherein said reversible pressure sensitive adhesive layer is in the form of screen like stripes, adapted to be applied to highly polished surfaces.

References Cited

UNITED STATES PATENTS

| | | | |
|---|---|---|---|
| 3,285,771 | 11/1966 | Dabroski | 117—1 |
| 1,619,081 | 3/1927 | McLaurin | 161—406 |
| 2,039,284 | 5/1936 | Hartzell | 161—167 |
| 2,652,351 | 9/1953 | Gerhardt | 161—167 |
| 2,929,544 | 3/1960 | Herschler | 156—291 |

ROBERT F. BURNETT, Primary Examiner

R. J. RICHE, Assistant Examiner

U.S. Cl. X.R.

40—2, 125; 117—45, 76, 122; 161—146, 167, 406